(12) United States Patent
Best (10) Patent No.: US 12,314,372 B2
(45) Date of Patent: May 27, 2025

(54) ANTI-COUNTERFEITING APPLICATIONS FOR ADVANCED MEMORIES

(71) Applicant: CRYPTOGRAPHY RESEARCH, INC., San Jose, CA (US)

(72) Inventor: Scott C. Best, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 503 days.

(21) Appl. No.: 17/612,527

(22) PCT Filed: May 21, 2020

(86) PCT No.: PCT/US2020/034086
§ 371 (c)(1),
(2) Date: Nov. 18, 2021

(87) PCT Pub. No.: WO2020/237093
PCT Pub. Date: Nov. 26, 2020

(65) Prior Publication Data
US 2022/0237281 A1    Jul. 28, 2022

Related U.S. Application Data (60) Provisional application No. 62/852,103, filed on May 23, 2019.

(51) Int. Cl.
*G06F 21/00* (2013.01)
*G06F 12/14* (2006.01)
*G06F 21/44* (2013.01)

(52) U.S. Cl.
CPC .......... *G06F 21/44* (2013.01); *G06F 12/1458* (2013.01); *G06F 2212/1052* (2013.01)

(58) Field of Classification Search
None
See application file for complete search history.

(56) References Cited

U.S. PATENT DOCUMENTS 8,132,073 B1 * 3/2012 Bowers ............... G06F 21/6227
713/160
8,627,414 B1 * 1/2014 McCune ................. G06F 21/44
713/168

(Continued)

OTHER PUBLICATIONS

Gurabi, Mehdi Akbari et al. Hardware based Two-Factor User Authentication for the Internet of Things. 2018 14th International Wireless Communications & Mobile Computing Conference (IWCMC). https://ieeexplore.ieee.org/stamp/stamp.jsp?tp=&arnumber=8450397 (Year: 2018).*

(Continued)

*Primary Examiner* — Jeremiah L Avery
(74) *Attorney, Agent, or Firm* — LOWENSTEIN SANDLER LLP (57) ABSTRACT

A block of data is provided from a verifier module to an authenticator module, the size of the block being correlated with one or more desired characteristics of the authenticator module. The verifier module receives a response from the authenticator module, the response comprising data result derived from a calculation involving the challenge value and the block of data. The verifier module verifies whether the response is indicative of the one or more desired characteristics of the authenticator module.

20 Claims, 5 Drawing Sheets

(56) References Cited

U.S. PATENT DOCUMENTS

| | | | |
|---|---|---|---|
| 8,848,905 B1 | 9/2014 | Hamlet et al. | |
| 9,412,278 B1* | 8/2016 | Gong | G06F 21/6227 |
| 9,736,147 B1* | 8/2017 | Mead | G06F 21/31 |
| 9,781,305 B1* | 10/2017 | Ness | G03G 21/1878 |
| 2003/0196028 A1* | 10/2003 | Maeda | G06F 12/0246 |
| | | | 711/103 |
| 2005/0210179 A1* | 9/2005 | Walmsley | G06F 21/445 |
| | | | 711/3 |
| 2007/0036353 A1* | 2/2007 | Reznik | H04L 63/0428 |
| | | | 380/30 |
| 2007/0174429 A1* | 7/2007 | Mazzaferri | H04L 63/102 |
| | | | 709/218 |
| 2009/0185014 A1* | 7/2009 | Silverbrook | G06K 1/121 |
| | | | 347/86 |
| 2009/0240945 A1 | 9/2009 | Aronson | |
| 2012/0221860 A1* | 8/2012 | Hoornaert | G06F 21/34 |
| | | | 713/172 |
| 2013/0268444 A1* | 10/2013 | Namgoong | H04L 63/08 |
| | | | 726/4 |
| 2013/0346756 A1* | 12/2013 | Cook | G06F 21/00 |
| | | | 711/E12.001 |
| 2014/0126306 A1 | 5/2014 | Otterstedt et al. | |
| 2014/0281554 A1* | 9/2014 | Maletsky | H04L 9/3268 |
| | | | 713/175 |
| 2014/0283040 A1* | 9/2014 | Wilkerson | G06F 12/145 |
| | | | 726/22 |
| 2015/0195088 A1* | 7/2015 | Rostami | H04L 9/3278 |
| | | | 380/28 |
| 2016/0330201 A1* | 11/2016 | Nguyen-Huu | H04L 9/0822 |
| 2017/0041395 A1* | 2/2017 | Kupcu | H04L 67/1097 |
| 2017/0177368 A1* | 6/2017 | DeHon | G06F 12/1408 |
| 2018/0307862 A1 | 10/2018 | Kim et al. | |
| 2018/0359811 A1* | 12/2018 | Verzun | H04L 12/28 |
| 2019/0097793 A1* | 3/2019 | Nix | H04L 63/0807 |
| 2019/0253431 A1* | 8/2019 | Atanda | G06F 21/62 |
| 2019/0272705 A1* | 9/2019 | Ruiz | G06F 21/602 |
| 2020/0143085 A1* | 5/2020 | Cooner | G06F 21/6263 |
| 2020/0174010 A1* | 6/2020 | Pfeiffer | G01N 27/44791 |
| 2020/0175235 A1* | 6/2020 | Pfeiffer | G06K 7/02 |
| 2020/0175524 A1* | 6/2020 | Pfeiffer | C12Q 1/68 |
| 2020/0336895 A1* | 10/2020 | Bartlett | H04L 9/3247 |

OTHER PUBLICATIONS

Wang, Eric et al. Hardware Module-Based Message Authentication in Intra-vehicle Networks. 2017 ACM/IEEE 8th International Conference on Cyber-Physical Systems (ICCPS). https://ieeexplore.ieee.org/stamp/stamp.jsp?tp=&arnumber=7945010 (Year: 2017).*

Extended European Search Report with Mail Dated May 24, 2023 re: EP Appln. No. 20809170.2. 6 pages.

Notification of Transmittal of the International Search Report and the Written Opinion of the International Searching Authority, or the Declaration with Mail Date Aug. 2, 2020 re: Int'l Appln. No. PCT/US2020/034086. 11 Pages.

* cited by examiner

FIG. 8

ANTI-COUNTERFEITING APPLICATIONS FOR ADVANCED MEMORIES

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to exchange of data between a verifier module and an authenticator module that is contained within a device or an article whose authenticity is being verified. The authenticator module may be in the form of an integrated circuit (IC) (an IC is also described as a "chip" in the specification), referred to as a prover chip, contained within the device or article being verified. The verifier module may be implemented as a standalone chip or as software executed by a processor in a host central processing unit (CPU). The verifier module checks whether the prover chip can load a large amount of received data fast enough, indicating that the prover chip contains the desired type of advanced memory that only a genuine chip is likely to contain.

One of the characteristics of counterfeit chips is that counterfeit chips do not usually contain advanced memory built with leading-edge technology nodes. Non-limiting examples of advanced memory are Magnetoresistive Random Access Memory (MRAM) or Resistive Random Access Memory (RRAM)-based non-volatile memory (NVM) built in advanced technology nodes (e.g., 22 nm or smaller). The term "technology node" (or simply "node") indicates feature sizes of underlying devices in a specific generation of chips made with a particular process technology. An anti-counterfeiting security chip refers herein to a chip that facilitates proving the genuineness of a device or an article. An anti-counterfeiting security chip may include a prover chip with embedded NVM built in an advanced technology node, enabling the security chip to operate at lower power with very low memory latency. The term "latency" indicates the delay before a transfer of data begins following an instruction for its transfer. Compared to an authentic anti-counterfeiting security chip, a counterfeit clone chip is likely to have inferior embedded memory which is not built with the leading-edge technology. For example, a counterfeit chip may be built in a 65 nm technology node and use legacy Electrically Erasable Programmable Read-Only Memory (EEPROM). Counterfeit chips with legacy memory are likely to have higher latency than genuine chips with advanced memory. Counterfeit chips with inferior legacy memory are also likely to require higher power-supply voltage than genuine chips with advanced memory.

Aspects of the present disclosure take advantage of this inherent behavioral difference between an authentic anti-counterfeiting security chip with advanced memory and a counterfeit clone chip with inferior memory to detect counterfeiting attempts. As a non-limiting illustrative example, a printer that accepts an external cartridge benefits from detecting whether the external cartridge is authentic (i.e., designed to be compatible with the printer and not likely to damage or detrimentally affect the operation of the printer), or the external cartridge is a counterfeit clone that is likely to damage the printer or lead to malfunction or sub-par performance of the printer. Therefore, the printer CPU may want to verify the authenticity of the external cartridge before accepting it to be included in the printer. This verification can be done by sending a large data block to an authenticator module in the cartridge and checking how fast a desired response is received from the cartridge, as described in further detail below.

The present disclosure recognizes that an authentic anti-counterfeiting security chip is likely to include a fairly large amount of high-performance embedded NVM, such as MRAM or RRAM, which gives an authenticator module contained within the anti-counterfeiting security chip some desired characteristics, such as significantly faster write times than legacy memory technology, while also consuming substantially less power. For example, an authentic anti-counterfeiting security chip may include 1 Mbit of MRAM that can support a write bandwidth in the order of 64 bits every 1 µs. This means that the 1 Mbit memory can be programmed in under 20 ms, assuming data can be supplied to the chip with sufficient bandwidth. Compared to that, a traditional EEPROM memory requires about 1 ms of programming time for each 64-bit chunk of data, requiring closer to 20 s for the same data load.

This behavioral difference between advanced memory and a traditional memory can be leveraged in the anti-counterfeiting security chip context in several ways. For example, when an anti-counterfeiting security chip is added to a system, a host CPU may recognize that the security chip is new and that it should be verified for authenticity prior to use. One of the ways this verification can be done is by using a challenge/response authentication technique. Challenge/Response authentication is a family of protocols where one party presents a question and the other party provides a valid answer in order to be authenticated. Example applications of such protocols include, without limitation, authentication between a printer and a cartridge to ensure that both devices are genuine and not counterfeit. Note that the scope of the present disclosure encompasses one-way authentication (e.g., where a verifier confirms the authenticity of a prover) and mutual two-way authentication (e.g., where the prover confirms the authenticity of the verifier before itself confirming its authenticity to said verifier).

Accordingly, aspects of the present disclosure provide an efficient means for differentiating between genuine articles and counterfeit clones based on inherent characteristics of embedded memory (e.g., size of memory, type of memory, speed of memory, or a speed of interface of the authenticator chip) without taking up significant die area and/or without consuming much power.

Figure 1:
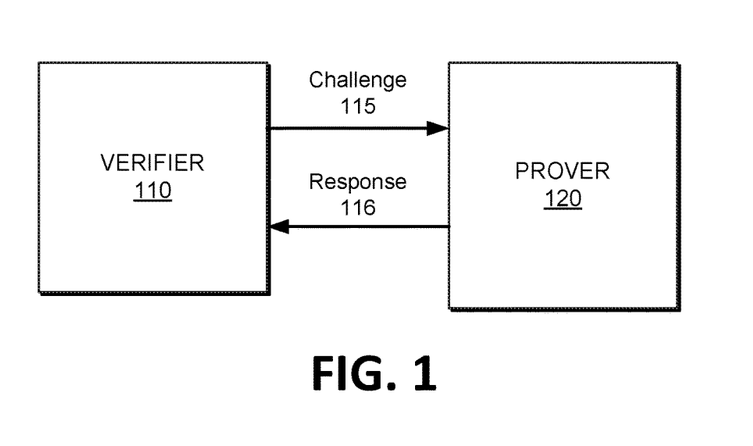
FIG. 1 is a block diagram of the key functional components of a challenge/response-based authentication system, in accordance with some embodiments.

FIG. 1 illustrates the basic components of a challenge/response-based authentication system, in accordance with some aspects of the present disclosure. A verifier 110 sends the challenge 115 to a prover 120, and receives a response 116 from the prover 120. The intention here is for the prover 120 to demonstrate that it knows a secret value without directly revealing that value. It does so by completing a calculation that can only be performed correctly with knowledge of the secret value. As mentioned above, prover 120 may be implemented as an IC. In such an embodiment, the secret value is "known" to the prover chip because it is programmed into it (e.g., within some combination of the chip's circuitry and/or embedded memory). Verifier 110 may be implemented as a standalone chip or as software executed by a processor in a host CPU. In typical use, the challenge value 115 is a random number, and response 116 is an encrypted version of the challenge value. Note that in one-way authentication, the prover chip typically releases to the verifier the response upon completion without any further verification; in mutual authentication, the prover chip waits to release the response until the verifier demonstrates that it already knows the correct response (e.g., the verifier transmits to the prover a value derived from the correct response). Encryption is one example of a calculation that can only be completed correctly if the encryptor has knowledge of the secret value. Based on the received response 116, verifier 110 determines whether prover 120 has knowledge of the secret value. This type of authentication is generally known as "proof of knowledge". Multi-factor authentication describes a system in which "proof of knowledge" (e.g., some value that the prover knows) is combined with "proof of ownership" (e.g., something the prover has) such as whether a prover chip can load a large amount of received data fast enough, indicating that prover 120 has access to the desired type of advanced memory that only a genuine prover is likely to have.

Figure 2:
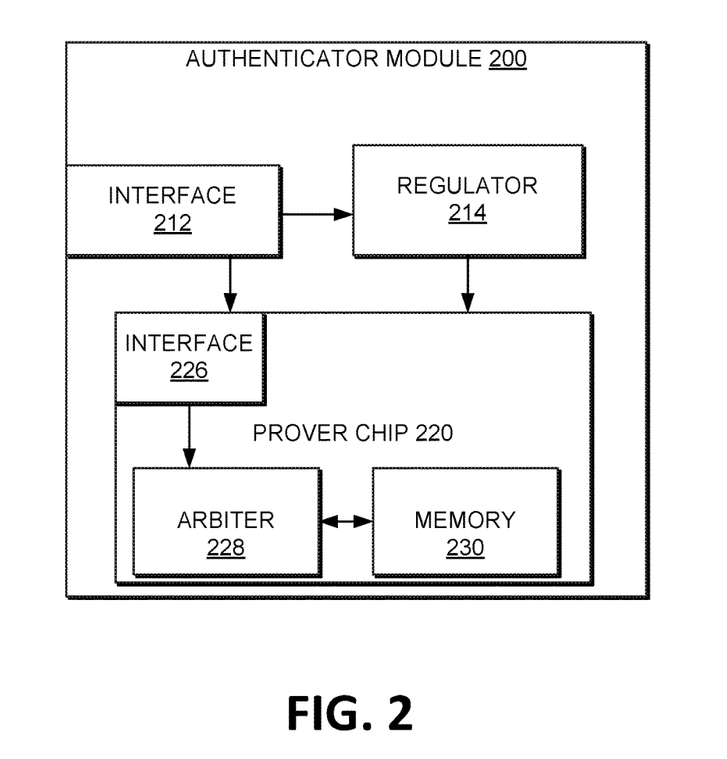
FIG. 2 is an example implementation of an authenticator module, in accordance with an embodiment of the present disclosure.

FIG. 2 illustrates an example implementation of an authenticator module 200 that contains a prover chip 220. Prover chip 220 may be the same as prover 120 of FIG. 1. Authenticator module 200 may be disposed within an article or a device whose authenticity is being verified. In one embodiment, authenticator module 200 is, for example, part of a printer consumable, such as an ink or toner cartridge. Authenticator module 200 may have a first interface 212 to receive a challenge value (e.g., challenge 115 in FIG. 1) from a verifier module (e.g., verifier 110) that has initiated a challenge/response protocol. Authenticator module 200 may contain a sub-component in the form of a prover chip 220, that may have a second interface 226 to receive the challenge value from the first interface 212 within the prover chip 220. The second interface 226 may be an inter-integrated-circuit (PC) interface, which is a synchronous serial computer bus that is used for attaching peripheral ICs to processors and microcontrollers in short distance intra-board communication. Prover chip 220 may also have an arbiter 228 that receives the challenge value from the second interface 226. A memory arbiter in this context is simply a circuit or process used within a shared memory system that mediates access to that shared memory. In this embodiment, the memory arbiter communicates with the internal memory 230 within prover chip 220. In other embodiments, as described below, memory 230 is realized on a separate chip that is disposed on the same authentication module 200 as prover chip 220. As mentioned above, memory 230 within prover chip 220 may comprise the high-performance low-latency advanced memory, e.g., MRAM or RRAM built with 22 nm or more advanced node in some embodiments. In one embodiment, memory 230 might contain not only the secret value necessary for performing the "proof of knowledge" calculation, but can also support high-speed (i.e., low-latency) programming of a large amount of additional data that accompanies the challenge 115 received from the verifier 110. In some embodiments, the response value is calculated by encryptor module 232 performing cryptographic operations within the prover chip. As described above, the encrypted value of the challenge is the response 116 (shown in FIG. 1) which is communicated back to verifier 110. Specific examples of types of cryptographic operations may be based on, but are not limited to, Advanced Encryption standard (AES), Data Encryption Standard (DES), Secure Hash Algorithm (SHA)-1, SHA-2, International Data Encryption Algorithm (IDEA), Rivest-Shamir-Adleman (RSA) Algorithm, Rivest Cipher 6 (RC6), Extended Tiny Encryption Algorithm (XTEA), etc.

In some embodiments, prior to the encryption of the challenge value, a modification algorithm can be performed on a received challenge value. For example, in addition to providing the challenge value 115, the verifier 110 might also provide a large block of data (e.g., 1 Mbit) comprising a "lookup table" to the prover chip which the prover chip will store in memory block 230. In some embodiments, the prover chip will perform a series of swapping operations on the challenge value 115, using values from this lookup table, resulting in a modified challenge value. This table could, for example, be comprised of 65,536 rows of 16-bit random values each. And, in some embodiments, for every 16-bits of data in the received challenge value 115, the prover chip swaps those 16-bits with the corresponding 16-bit entry in the lookup table. After the swapping operations complete, the response calculation can be performed (e.g., using encryptor 232), and the results of that calculation may be transmitted back to the verifier module as a response value 116. In this way, the authenticator module performs both "proof of knowledge" (i.e., encryption using a secret value) and "proof of ownership" (i.e., advanced memory sufficient to store the received lookup table data and utilize it as described). Note that in some embodiments, a new lookup table is provided by the verifier for every authentication; in other embodiments, a single lookup table can be used for multiple authentication operations. For example, a lookup table could be loaded by the verifier into the prover chip during power-on, and then subsequently used for all subsequent authentications until power is cycled or the system reset. Note that in other embodiments, the large data block received from the verifier 100 is algorithmically combined with the challenge value 115 during response calculation in ways other than swapping. For example, basic mathematical operations (e.g., addition, subtraction, multiplication, etc), basic logical operations (e.g., AND, NOR, XOR, etc.), or more sophisticated transformations (e.g., encryption, hashing, rotations, etc.) including combinations of transformations (e.g., XOR followed by rotation, etc.) could alternatively be used.

In some embodiments, authenticator module 200 has a regulator 214 that provides power to the prover chip 220. Regulator 214 is able to power-cycle prover chip 220 when an appropriate signal (e.g., expiration of a predetermined duration set by a timer) is received from the verifier 110. This could be used, for example, by the verifier to assure that the lookup table data is stored in advanced non-volatile memory (e.g., MRAM) and not in high-bandwidth but legacy volatile memory (e.g., SRAM). For example, after the verifier 110 communicates the 1 Mbit of table data to the authenticator module, it could—on expiration of the timer—signal the regulator 214 to power-cycle, thereby corrupting the storage of the table data in any volatile memory circuits.

Figure 3:
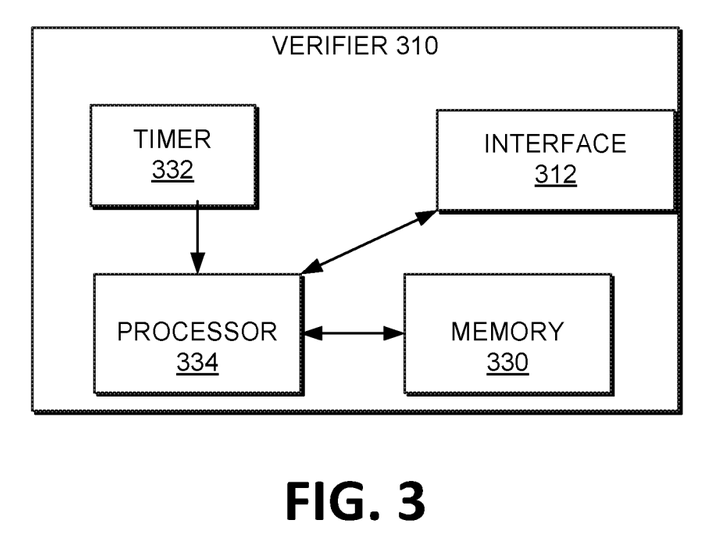
FIG. 3 is an example implementation of a verifier module, in accordance with an embodiment of the present disclosure.

FIG. 3 illustrates an example implementation of a verifier module 310. The verifier module 310 may be the same as verifier 110 of FIG. 1. The verifier module 310 may have an interface 312 to communicate table data and challenge values (e.g., challenge 115 in FIG. 1) to an authenticator module (e.g., module 200 in FIG. 2), and receive response values (e.g., response 116 in FIG. 1) from the authenticator module. Verifier module 310 may have a random number generator (not shown) which generates a random number that may be used during formation of either or both the large data block and/or the challenge value. Note that the data block should be sufficiently large (e.g., 1 Mbit) to enable verification of one or more desired characteristics of the authenticator module, such as, memory size, memory type, memory speed, interface speed etc. Also, note that after the large data block and challenge value are communicated to the authenticator module 200, verifier needs to repeat at least portions of the calculation involving the large data block, the challenge value, and the secret value (which may be stored in the internal memory 330, which is coupled to a processor 334) so that it can ascertain the validity of received responses 116. The processor 334 may be a CPU of a host system that the verifier module is a part of. The internal memory 330 may be of the same type as the internal memory 230 in the authenticator module, or of a different type. The processor is configured to verify whether a response received from an authenticator module is indicative of genuineness of the article containing the authenticator module, as described in more detail with respect to FIG. 7. In some embodiments, the processor 334 independently calculates the target value of the response corresponding to the challenge value transmitted to the authenticator module. When the response received from the authenticator module matches the locally calculated target value of the response, the article containing the authenticator module is certified as genuine. As described previously, in mutual-authentication systems the verifier may be required to transmit to the authenticator module a value derived from the target value, prior to the authenticator module releasing the response.

Verifier module 310 may also have a timer 332. The timer 332 can be initiated as soon as the challenge value is transmitted to the authenticator module. If the response is not received before the timer expires, then the verifier module may decide that the authenticator module does not have the desired kind of advanced memory (e.g., if an authentic prover chip 220 had been replaced with a counterfeit prover chip that utilized lower-performance memory). In other embodiments, the timer can be initiated as soon as the large block of data is transmitted to the authenticator module. In this embodiment, when the timer expires the verifier could further send a signal to regulator 214 to trigger a power cycling for the prover chip 220. If the authenticator module does not have the desired high-performance advanced non-volatile memory, but instead was utilising high-performance but volatile memory (e.g., such as SRAM), this power-cycling event could (as described earlier) corrupt the storage of the large data block in those volatile memory circuits.

Note that the challenge/response protocol-based authentication described above can be employed the first time the authenticator module is added to a host system containing the verifier module. The techniques described in this disclosure may also be used for subsequent scheduled or unscheduled authentications. During the initial large data block loading process, the internal memory 230 of the authenticator module 200 may store a data structure (e.g., a look-up table) containing a plurality row/column pairs transmitted by the verifier module 310 that may be utilized for subsequent authentications by the verifier module 310. A genuine authenticator module, built with advanced memory, would respond to subsequent challenges from the verifier module 310 correctly, while a counterfeit authenticator module is likely to fail, because it was not able to store the large data block quickly enough during the initial data-load. The size of the data block may be 1 Mbit or even larger.

Note that FIG. 2 shows an embodiment where the entire internal memory 230 in the prover chip 220 is embedded in advanced non-volatile MRAM or RRAM memory. However, other configurations of the prover chip are possible too, as shown in FIGS. 4-6, where some degree of non-volatility is added to the otherwise volatile memory using additional components.

Figure 4:
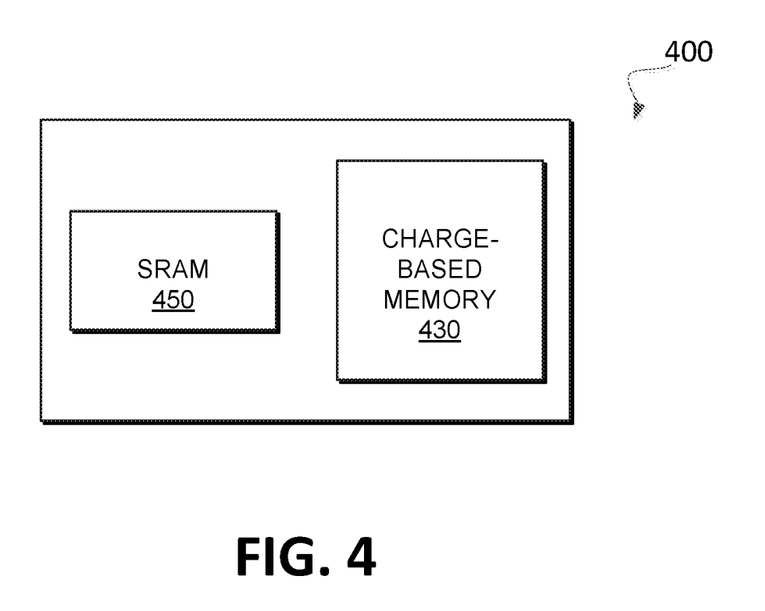
FIG. 4 illustrates an embodiment of a prover chip using Static Random Access Memory (SRAM) and another type of charge-based memory, in accordance with the present disclosure.

FIG. 4 illustrates an alternative embodiment of a prover chip 400, where the memory within the prover chip 400 comprises a volatile Static Random Access Memory (SRAM) buffer 450 and another type of charge-based non-volatile memory 430, such as EEPROM memory.

Figure 5:
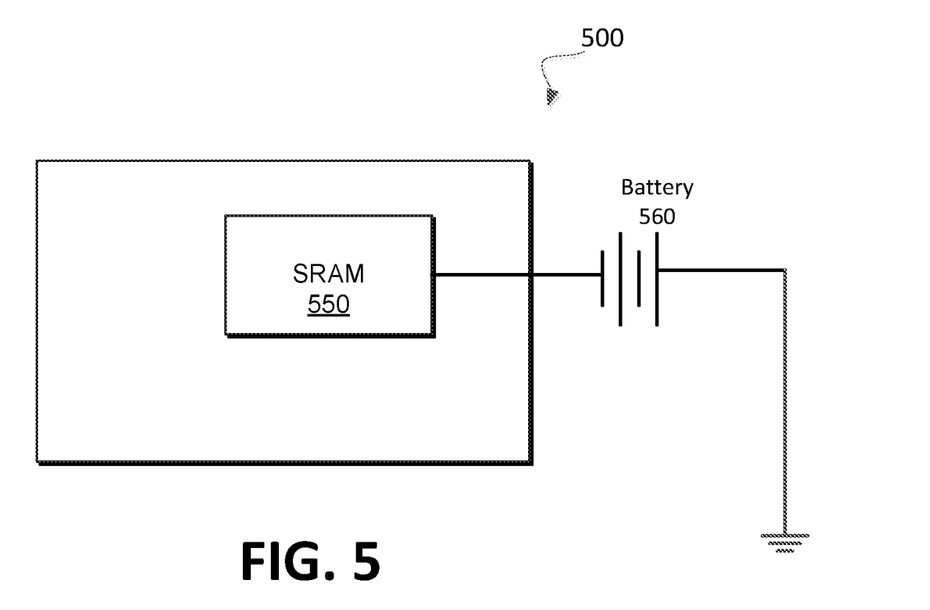
FIG. 5 illustrates another alternative embodiment of a prover chip using a battery-backed SRAM memory, in accordance with the present disclosure.

FIG. 5 illustrates another alternative embodiment of a prover chip 500 using a battery-backed SRAM memory 550. The battery 560 attributes non-volatility to the SRAM memory 550.

Figure 6:
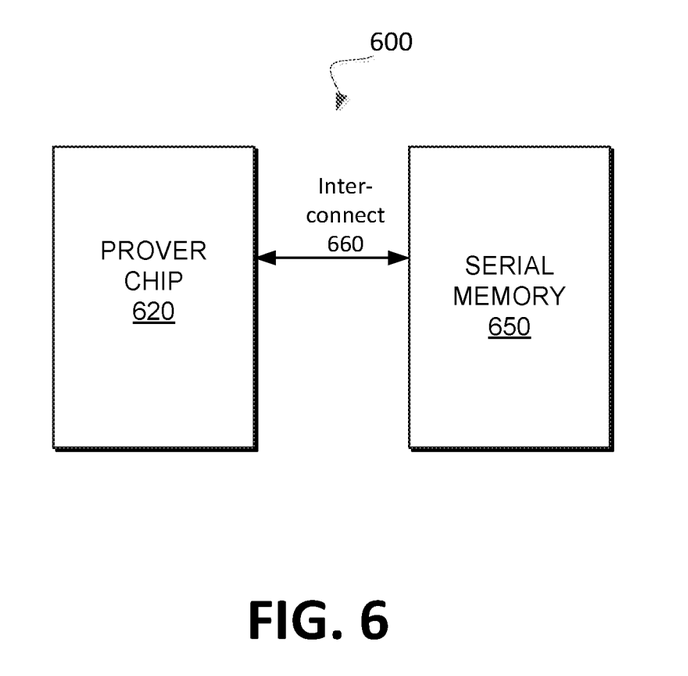
FIG. 6 illustrates yet another alternative embodiment of a prover chip using a separate serial memory integrated circuit (IC) connected to the prover chip using a high-speed interconnect, in accordance with the present disclosure.

FIG. 6 illustrates yet another alternative embodiment 600 where a prover chip 620 with volatile SRAM memory is connected to a separate serial memory chip 650 using a high-speed interconnect 660.

Persons skilled in the art would appreciate that though embodiments shown in FIGS. 4-6 are viable alternative configurations of a prover chip, none of them is likely to match the latency of a prover chip 220 shown in FIG. 2 which uses internal, advanced non-volatile embedded memory without additional battery back-up or interconnects. In fact, counterfeit security chips may employ the alternative embodiments shown in FIGS. 4-6, which will be detected readily by the techniques disclosed in the present application. Additionally, although some of the memory configurations shown in FIGS. 4-6 may be able to mimic the latency of advanced MRAM or RRAM, they would consume much higher power.

In order to verify that a volatile memory in a counterfeit chip is not propped up with a battery, the VDD power-supply signal supplied by regulator 214 in the authenticator module 200 shown in FIG. 2 may be brought back to the verifier module 310 as an input signal to a General Purpose Input/Output (GPIO) port, and the processor 334 can monitor that signal to see if the regulator is correctly responding to power-cycle signals, or whether it is being reinforced with an on-module battery. Alternatively or additionally, the regulator circuit can include an always-on discharge path (e.g., 1 mA discharge path), which could eventually drain the battery and expose the counterfeit nature of the chip when it fails a verification attempt by the verifier module.

Figure 7:
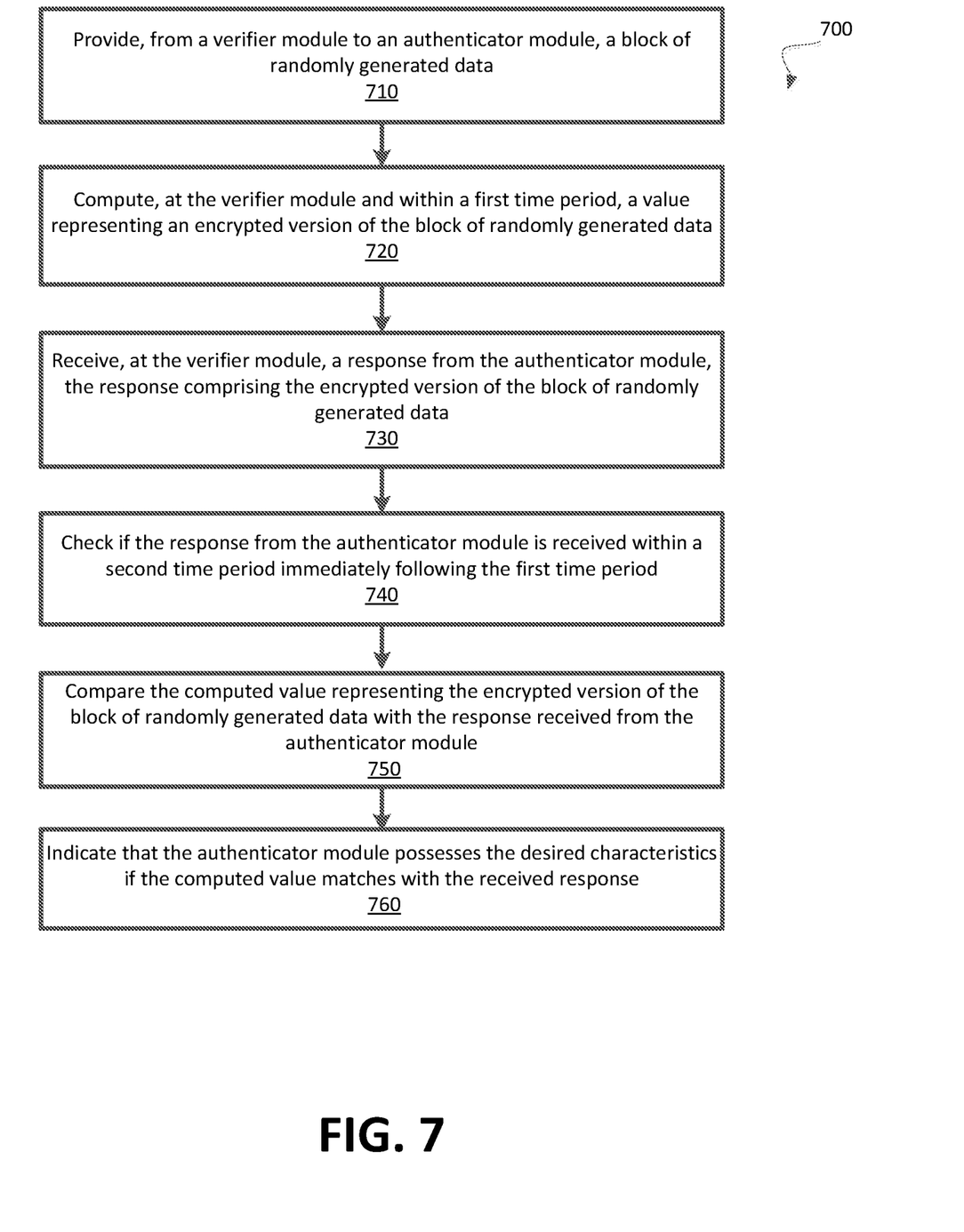
FIG. 7 is a flow diagram of an example method describing operations of the verifier and the authenticator modules, in accordance with some embodiments of the present disclosure.

FIG. 7 is a flow diagram of an example method 700 to perform a challenge/response-based authentication system, in accordance with some aspects of the present disclosure. The method 700 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 may be performed by the verifier module 310 shown in FIG. 3.

The example method 700 begins at operation 710, where a block of data may be provided from a verifier module to an authenticator module. The block of data may be generated with contributions from a random number generator within the verifier module, e.g. verifier module 310 shown in FIG. 3. In some embodiments, after providing the data block to the authenticator module, the verifier module may then signal for a power-down of the voltage regulator circuit within the authenticator module, in order to insure that the block of data has been stored in non-volatile memory within the authenticator module.

At operation 715, a challenge value may be provided from a verifier module to an authenticator module. This value may also be generated with contributions from a random number generator within the verifier module, e.g. verifier module 310 shown in FIG. 3. Note that in some embodiments the block of data from operation 710 and challenge value from this step may be communicated contemporaneously from the verifier to the authentication module, while in other embodiments the block of data and challenge value are communicated separately.

At operation 720, a value representing a calculation involving both the block of data and the challenge value is locally computed at the verifier module within a first time period. This operation may be performed by the processor 334 shown in FIG. 3. Note that this operation may take place after the generation of the block of data and the challenge values, but before sending those values to the authenticator module. As mentioned above, there are a variety of ways that the challenge value can be algorithmically modified based at least in part on the block of data. There are also a variety of calculations which can be used to derive the desired response, including but not limited to encryption.

At operation 730, the verifier module receives a response from the authenticator module. The response may comprise the result of a calculation involving a modified version of the challenge after its algorithmic modification involving the block of data. Note that the algorithmic modification of the challenge value in this step may be the same algorithmic modification performed by the verifier within step 720. Also, the response may be calculated by an encryptor module 232 shown in FIG. 2, and may further involve a secret value stored in the circuitry or local memory 230 of the prover chip 220. In an embodiment, the block of data comprises a "lookup table" comprising a plurality of row/column data pairs in a tabular form (or other form of data structure) that are loaded in the memory 230 during the initialization process, i.e. the first time the verifier module attempts to verify the authenticity of the prover chip.

At operation 740, the verifier module checks if the response from the authenticator module is received within a second time period following the first time period. This second time period may be part of the initialization process, or part of any subsequent verification process. If the response is received within the second time period, the method may proceed to operation 750. In some embodiments, if the response is not received within the second time period, the method may determine authentication failure, indicating that the prover chip 220 may be counterfeit. The method may abort as soon as this determination is made, but in other embodiments, even if the response is not received within the second time period, the method may proceed to operation 750.

At operation 750, the response value received at operation 730 is compared with the target response value computed locally at the verifier module at operation 720. This comparison may be performed by processor 334.

At operation 760, if the computed response value matches the received response value, the verifier module indicates that the authenticator module possesses the desired characteristics of a genuine security chip. On the other hand, if the computed response value does not match the received response value, or if the authentication failure due to timer evaluation in step 740 had not yet been acted upon, then the verifier module may indicate that the authenticator module does not belong to a genuine security chip. This indication by the verifier module may trigger other operations not shown in FIG. 7. For example, a printer may refuse to accept a cartridge if the security chip is indicated to be not genuine.

Persons skilled in the art will understand that although the flow diagram in FIG. 3 shows a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 8:
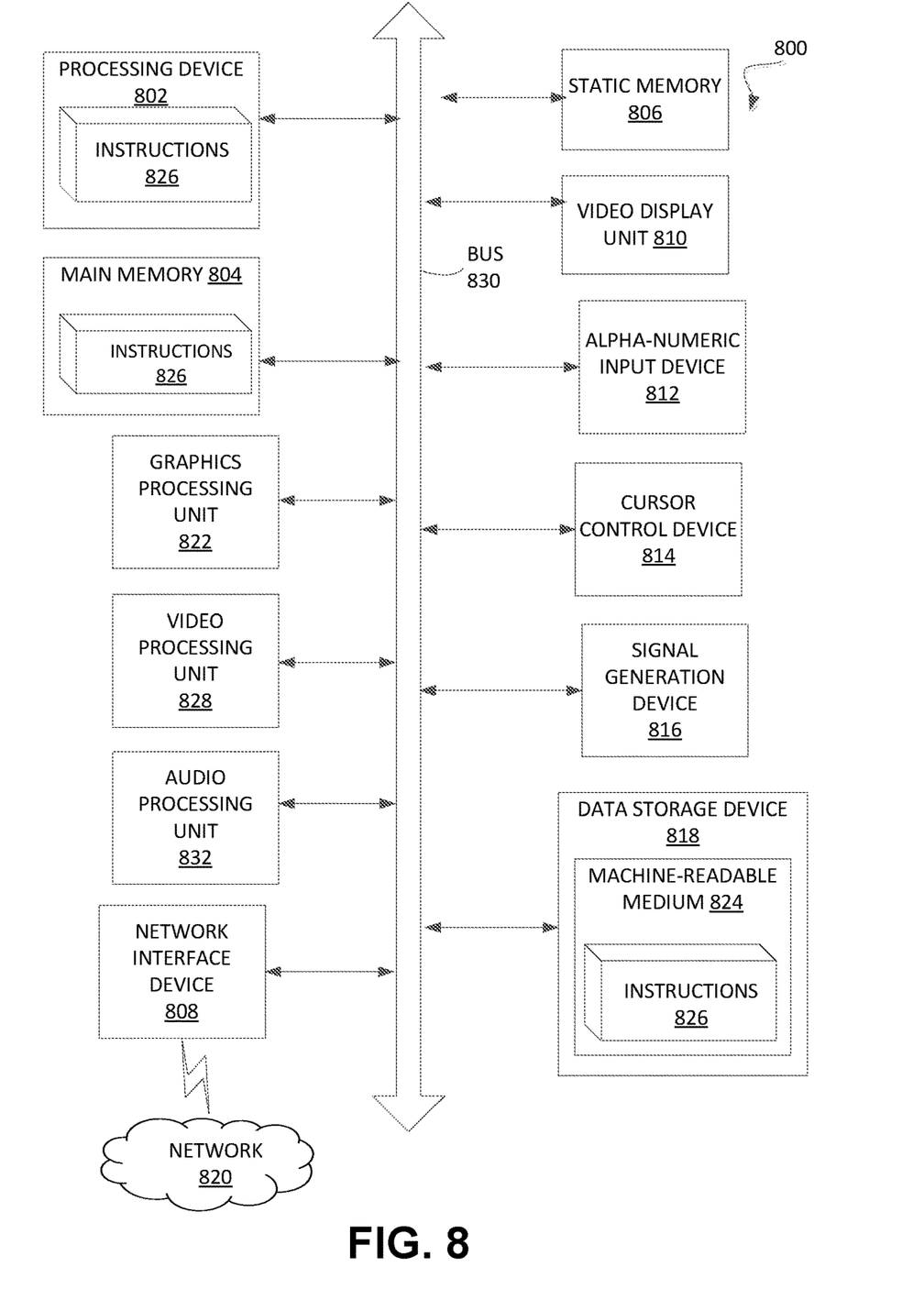
FIG. 8 illustrates a block diagram of a sample computer system in which some embodiments of the disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. In one implementation, processing device 802 may be processor 334 in FIG. 3.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality of verifier 310 of FIG. 3. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
providing, from a verifier module to an authenticator module, a block of data generated within the verifier module, a size of the block being correlated with one or more desired characteristics of the authenticator module, wherein the verifier module is a part of a host device, and the authenticator module is a part of an external add-on device to be connected with the host device;
providing, from the verifier module to the authenticator module, a challenge value;

receiving, at the verifier module, a response from the authenticator module, the response comprising a result derived from a calculation involving at least the challenge value and the block of data; and verifying, at the verifier module, whether the response is indicative of the one or more desired characteristics of the authenticator module.

2. The method of claim 1, wherein the characteristics of the authenticator module include one or more of: a size of memory, a type of memory, a speed of memory, or a speed of interface of the authenticator module.

3. The method of claim 1, wherein the method further comprises:

prior to receiving the response, computing, at the verifier module and within a first time period, a target response value representing the result of the calculation involving the challenge value and the block of data;

after receiving the response, checking whether the response from the authenticator module is received within a predetermined second time period following the first time period; and in response to determining that the response from the authenticator module is received within the predetermined second time period, comparing the computed target response value with the response received from the authenticator module.

4. The method of claim 3, wherein the verifying further comprises:

in response to determining that the computed target response value matches with the response received from the authenticator module, indicating that the authenticator module possesses the desired characteristics.

5. The method of claim 4, wherein the verifying further comprises:

certifying that a device containing the authenticator module is not counterfeit.

6. The method of claim 1, wherein the block of data is randomly generated.

7. The method of claim 1, wherein the authenticator module algorithmically modifies the challenge value by performing a series of swapping operations on the challenge value, and storing the result of the swapping operations in an internal memory.

8. The method of claim 7, wherein the response from the authenticator module to the verifier module constitutes the stored result read from the internal memory of the authenticator module.

9. The method of claim 1, wherein the method further comprises:

prior to reading data from an internal memory of the authenticator module, power-cycling the authenticator module.

10. The method of claim 9, wherein the power-cycling comprises:

sending a signal from the verifier module to a regulator that power-cycles the authenticator module.

11. A system, comprising:

a verifier module and an authenticator module, operatively coupled to each other, wherein the verifier module is included in a host device and the authenticator module is included in an external add-on device to be connected with the host device, wherein the verifier module:

generates a block of data, a size of the block being correlated with one or more desired characteristics of the authenticator module;

provides the block of data to the authenticator module;

provides to the authenticator module a challenge value;

receives a response from the authenticator module, the response comprising a result derived from a calculation involving at least the challenge value and the block of data; and verifies whether the response is indicative of the one or more desired characteristics of the authenticator module.

12. The system of claim 11, wherein the characteristics of the authenticator module include one or more of: a size of memory, a type of memory, a speed of memory, or, a speed of interface of the authenticator module.

13. The system of claim 11, wherein the verifier module is further to:

prior to receiving the response, compute within a first time period, a target response value representing the result of the calculation involving the challenge value and the block of data;

after receiving the response, check whether the response from the authenticator module is received within a predetermined second time period following the first time period; and in response to determining that the response from the authenticator module is received within the predetermined second time period, compare the computed target response value with the response received from the authenticator module.

14. The system of claim 13, wherein the verifier module is further to:

in response to determining that the computed target response value matches with the response received from the authenticator module, indicate that the authenticator module possesses the desired characteristics.

15. The system of claim 14, wherein the verifier module is further to: certify that a device containing the authenticator module is not counterfeit.

16. The system of claim 11, wherein the block of data is randomly generated.

17. The system of claim 11, wherein the authenticator module comprises an internal memory, and wherein the authenticator module algorithmically modifies the challenge value by performing a series of swapping operations on the challenge value, and storing the result of the swapping operations in the internal memory.

18. The system of claim 17, wherein the response from the authenticator module to the verifier module constitutes the stored result read from the internal memory of the authenticator module.

19. The system of claim 11, wherein the authenticator module further comprises:

a regulator that is configured to power-cycle the authenticator module upon receiving a signal from the verifier module.

20. The system of claim 19, wherein verifier module further comprises:

a timer that measures a response time of the authenticator module after the power-cycling.

* * * * *